US009404595B2

(12) United States Patent
Lallemant et al.

(10) Patent No.: US 9,404,595 B2
(45) Date of Patent: Aug. 2, 2016

(54) FLUID CIRCULATION VALVE

(71) Applicant: Valeo Systemes de Controle Moteur, Cergy Saint Christophe (FR)

(72) Inventors: Mathieu Lallemant, Maisons-Laffitte (FR); Franck Girardon, Conflans Sainte Honorine (FR); Patrick Lebrasseur, Montagny en Vexin (FR)

(73) Assignee: Valco Systemes de Controle Moteur, Cergy Saint Christophe (FR)

( * ) Notice: Subject to any disclaimer, the term of this patent is extended or adjusted under 35 U.S.C. 154(b) by 77 days.

(21) Appl. No.: 14/401,133

(22) PCT Filed: May 7, 2013

(86) PCT No.: PCT/FR2013/051019
§ 371 (c)(1),
(2) Date: Nov. 14, 2014

(87) PCT Pub. No.: WO2013/171411
PCT Pub. Date: Nov. 21, 2013

(65) Prior Publication Data
US 2015/0136254 A1    May 21, 2015

(30) Foreign Application Priority Data
May 15, 2012   (FR) ..................................... 12 54436

(51) Int. Cl.
*F16K 11/16* (2006.01)
*F16K 11/14* (2006.01)
*F02B 29/04* (2006.01)
*F16K 5/04* (2006.01)
*F16K 1/18* (2006.01)

(52) U.S. Cl.
CPC ............. *F16K 11/14* (2013.01); *F02B 29/0418* (2013.01); *F16K 1/18* (2013.01); *F16K 5/0407* (2013.01); *Y02T 10/121* (2013.01); *Y02T 10/146* (2013.01); *Y10T 137/87442* (2015.04)

(58) Field of Classification Search
CPC ........................................................ F16K 11/163
USPC ........................... 137/614.11, 614.13, 625.46
See application file for complete search history.

(56) References Cited

U.S. PATENT DOCUMENTS 1,004,019 A * 9/1911 Griffiths .................. G01F 11/32
137/614.13
1,155,094 A * 9/1915 Podlesak .................. F02M 1/00
123/441

(Continued)

FOREIGN PATENT DOCUMENTS

| CH | 583 393 A5 | 12/1976 |
| DE | 198 60 637 A1 | 7/2000 |
| EP | 1 363 013 A1 | 11/2003 |

OTHER PUBLICATIONS

International Search Report for corresponding International Application No. PCT/FR2013/051019, mailed Jul. 29, 2013 (2 pages).

*Primary Examiner* — John Fox
(74) *Attorney, Agent, or Firm* — Osha Liang LLP

(57) ABSTRACT

The invention relates to a fluid circulation valve comprising a body (2) through which said fluid can pass, and a first and second shutoff means (3, 3'), arranged in series, in the direction of flow of the fluid, in said body and each able, by rotation of said means (3, 3') with respect to said body (2) to occupy various angular positions, said valve further comprising a drive train allowing said shutoff means (3, 3') to be driven off one and the same actuating motor, said valve being configured to: —over a first angular range of said first shutoff means (3) allow said fluid to be metered in a first outlet port (40) of said valve, said second shutoff means (3') being in a position in which said first port (40) is wide open, —over a second angular range of said first shutoff means (3) allow said fluid to be metered in a second outlet port (42) of said valve, said second shutoff means (3') being in a second position in which said second port (40) is wide open.

15 Claims, 4 Drawing Sheets

(56) References Cited

U.S. PATENT DOCUMENTS 1,218,296 A * 3/1917 Moorhead ............... F01L 7/026
 123/190.2
4,208,884 A * 6/1980 Popham ................ F25D 21/125
 137/614.11
4,465,259 A * 8/1984 Allen .................... F16K 5/0615
 137/625.46

* cited by examiner

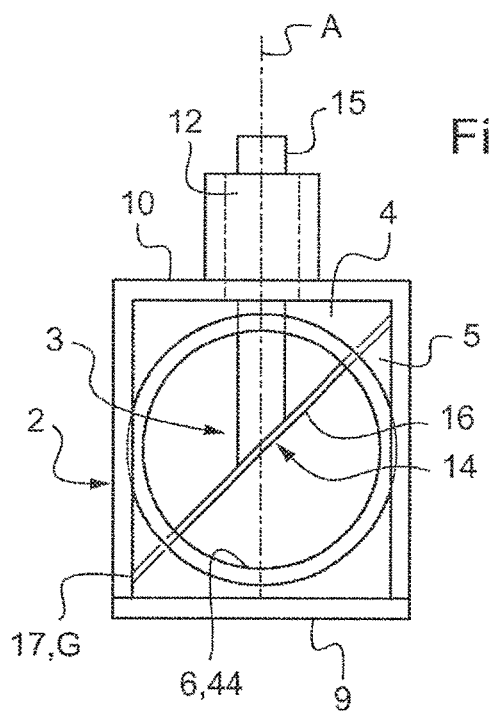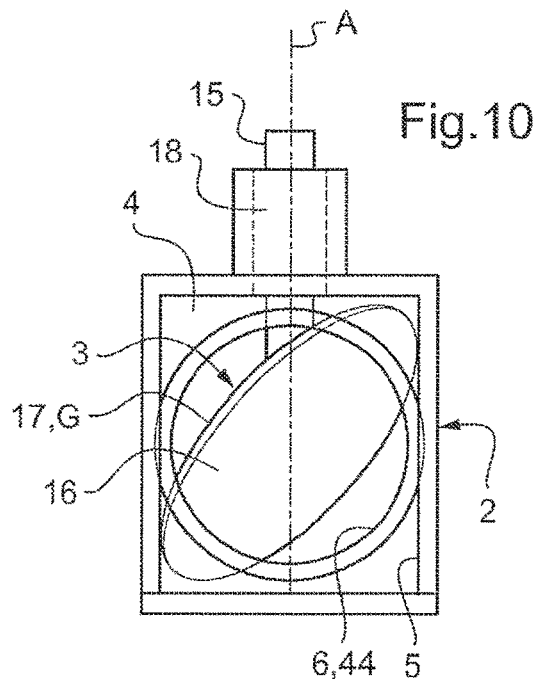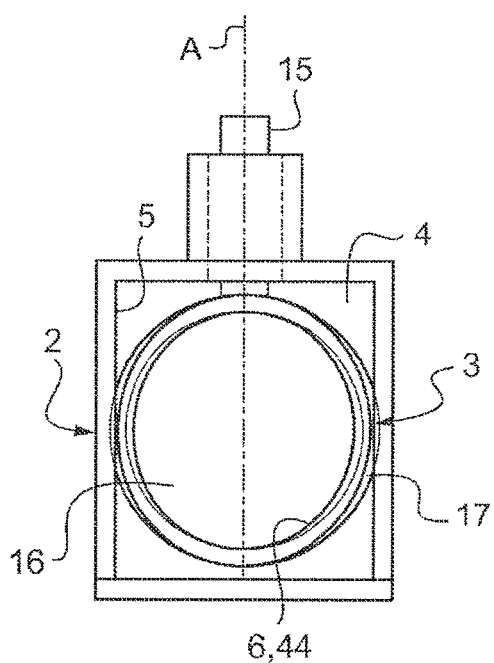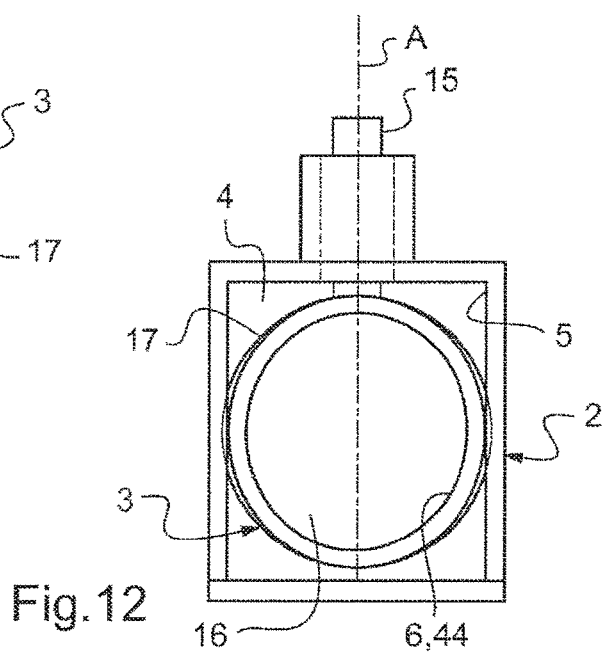

FLUID CIRCULATION VALVE

The present invention concerns a fluid circulation valve, intended more particularly but not exclusively for mounting on fluid circulation systems associated with internal combustion engines, either petrol or diesel powered, of vehicles, in particular motor vehicles.

Such valves can have various functionalities, and for example when fitted to diesel turbo-charged engines, can be used to meter the quantity of air supplied to the engine intake tract or to divert part of the exhaust gas circulating in the exhaust pipe and send it towards the intake tract, in particular for purposes of treatment of nitrous oxides. We then refer to recirculated exhaust gas. The valves according to the invention therefore concern in particular valves allowing gas circulation.

In recirculated exhaust gas circuits, it is known to use heat exchangers, called recirculated exhaust gas coolers, allowing a reduction in the temperature of said gas. In certain operating situations, however, it is not necessary to cool the exhaust gas. It is then useful to be able to circulate these towards the engine intake tract without passing via the heat exchanger. For this, the recirculated exhaust gas circuits comprise a cooled path fitted with a heat exchanger, and an uncooled path bypassing the cooled path.

Recirculated exhaust gas circuits are thus known which comprise a first valve allowing metering of the quantity of recirculated exhaust gas, and a second valve allowing conduction of the gas towards the cooled path or the uncooled path. It is evident that such circuits have disadvantages in that they require two separate valves.

A similar situation is found in the engine intake tracts. In fact here it is known to use supercharging air coolers. In certain operating situations, however, it is not necessary to cool the intake gases. It is then useful to be able to circulate these towards the engine without passing via the cooler. For this, the intake gas circuits comprise a cooled path fitted with the supercharging air cooler, and an uncooled path bypassing the cooled path.

Air supply circuits for the engine are thus known which comprise a first valve allowing metering of the quantity of intake gas into the cooled path, and a second valve allowing metering of the intake gas into the uncooled path. It is evident that such circuits also have disadvantages in that they require two separate valves.

The object of the present invention is to remedy these disadvantages, and it therefore concerns a fluid circulation valve comprising a body through which said fluid can pass, and a first and second shutoff means arranged in series, in the direction of flow of the fluid, in said body and each able to occupy different angular positions by rotation of said means in relation to said body, said valve also comprising a kinematic chain allowing driving of said shutoff means by the same actuating motor, said valve being configured to allow:
  over a first angular range of said first shutoff means, a metering of said fluid in a first outlet port of said valve, said second shutoff means being in a position in which said first port is fully open,
  over a second angular range of said first shutoff means, a metering of said fluid in a second outlet port of said valve, said second shutoff means being in a second position in which said second port is fully open.

Therefore one and the same element is provided which fulfills both the desired functions of metering and orientation. Such a valve configuration results in particular from a combined configuration of said body, said first and second shutoff means and said kinematic chain.

According to various embodiments of the invention which may be considered together or separately:
  said valve is also configured to allow, over a third and/or fourth angular range of said first shutoff means, closure of an intake passage of said valve,
  the third and fourth ranges alternate with the first and second ranges,
  said body comprises a first housing for the first shutoff means and a second housing for the second shutoff means, said first and second outlet passages opening, in particular axially, into said second housing,
  said intake passage opens, in particular radially, into said first housing,
  said body comprises a passage for the fluid connecting, in particular radially, said first and second housings, called the intermediate passage.

Advantageously, said kinematic chain, said body and said first and/or second shutoff means are configured to allow a rotation of said first and/or said second shutoff means over more than 360°.

Similarly said kinematic chain, said body and said first and/or second shutoff means are configured to allow a rotation of said first and/or second shutoff means in both directions.

According to one aspect of the invention, the first and/or second shutoff means each comprise at least one shutoff part arranged in a plane which is inclined in relation to the first and/or second housing respectively and cooperates with a side wall of the corresponding housing via a peripheral generatrix, so as to ensure a sealed contact between the first and/or second shutoff means firstly and the body secondly in at least one angular position.

Thus a seal can be obtained over the entire periphery of the flap without using secondary taper edges. The shutoff part can furthermore turn through 360° and ensure a seal with the side wall of the housing thanks to the continuous contact between them, given by the slope of the shutoff part with the housing wall, so that said shutoff part turns in either one direction or the other. It is also possible, depending on the valve configuration, to provide several closing positions, for example two positions spaced by 180°, sealed over the entire periphery of the flap.

Said inclined part of the first and/or second shutoff means is shaped for example as a rotary disk, the peripheral edge of which constitutes the generatrix for contact with the side wall of the corresponding housing so as to ensure a cylinder-on-cylinder contact.

Thus the projection of the inclined rotary disk along the rotation axis in the cylindrical housing is circular, and the disk cooperates perfectly with the side wall thereof with corresponding section. The simplicity of production of the inclined shutoff part is noted, which as stated above also allows the avoidance of leaks when the disk is in the closed position.

Said inclined shutoff part can form an angle of substantially 45° with the axis of the corresponding housing of the body.

Said first and/or said second shutoff means comprises for example a control rod which is linked to the inclined part in order to drive this in rotation and which is arranged in the axis of said corresponding housing, passing via the center of said inclined part. This rod thus simply carries the disk at the end, such that this embodiment of the shutoff means does not require the shaft which usually extends along the flap and leads to difficulties of assembly and the risks of leakage and interference associated with misalignment.

In fact the flap is no longer in the plane of its rotation shaft, which reduces the interference between the two parts. Furthermore, because of its symmetry, the flap can be mounted in either direction without the need for a polarization aid.

In particular said rod and said inclined part of the shutoff means can be produced as one piece, or be assembled fixedly to each other by molding, welding, gluing, fixing elements etc.

On the side opposite the inclined shutoff part, the rod in particular is mounted in a guide bearing integral with the body, and/or is connected at the outlet thereof to a means for driving said kinematic chain in rotation.

Said control rods of said first and second shutoff means may be parallel to each other.

Said inlet passage and said intermediate passage for said fluid open for example substantially radially in relation to said first housing with the first shutoff means, separating these in at least one of the angular positions.

Said inlet passage and said intermediate passage of the fluid are in particular coaxial and perpendicular to the axis of said first housing.

Said inlet passage and said intermediate passage of the fluid are for example circular and their diameters are less than a small axis of the disk of the corresponding inclined part, provided cooperating by its edge with the side wall of said first housing.

Various embodiments of the invention are described below with reference to the attached figures which illustrate how the invention can be implemented. On these figures, identical references designate similar elements.

FIGS. 9 to 12 represent respectively in cross section the positions of said shutoff means in the 90°, 45° and 5° open positions, and the 0° or 180° closed positions.

Figure 13:
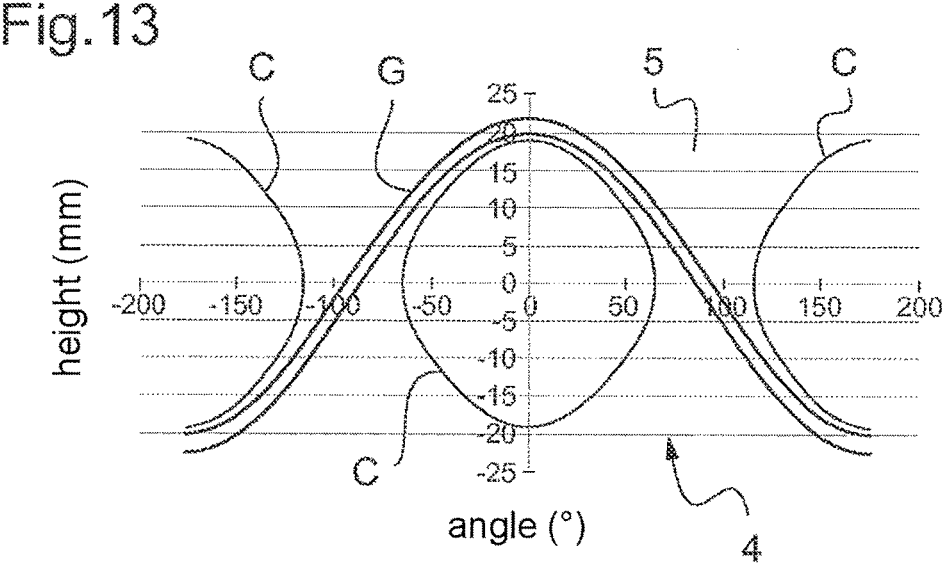
Figure 14:
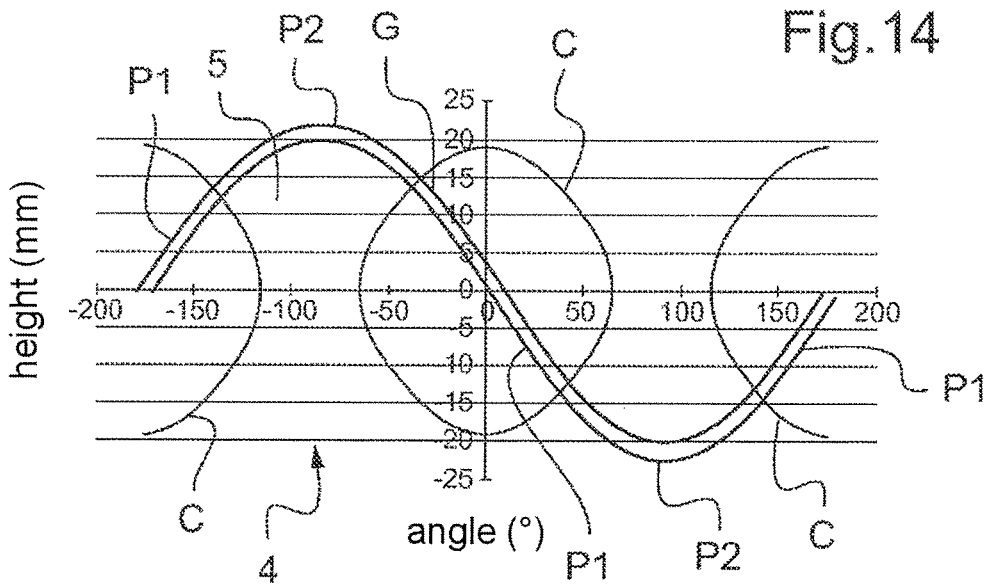

FIGS. 13 and 14 show graphs illustrating respectively the contact zone of said shutoff means in the closed and maximum open position on the housing of the body of said valve above, illustrated flat.

The fluid circulation valve according to the invention is intended to ensure metering of air introduced into the intake tract of an internal combustion engine, in particular a diesel engine, while it is understood that it can have any other function, in particular a function of metering recirculated exhaust gas.

Figure 1:
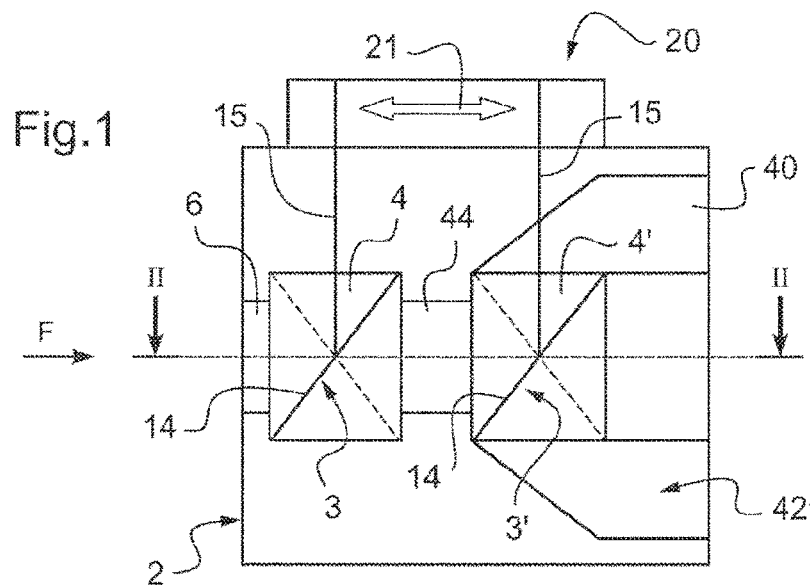
FIG. 1 is a diagrammatic cross-section view, in elevation, of a first embodiment of the valve according to the invention.

As shown in FIG. 1, said fluid circulation valve comprises a body 2 through which said fluid can pass, and a first and second shutoff means 3, 3' arranged in said body 2. Said first 3 and second 3' shutoff means are situated in series in the direction of flow of the fluid F. In other words, said valve is configured for the fluid circulation in said body to be determined firstly by said first shutoff means 3 and then by said second shutoff means 3'.

Figure 2:
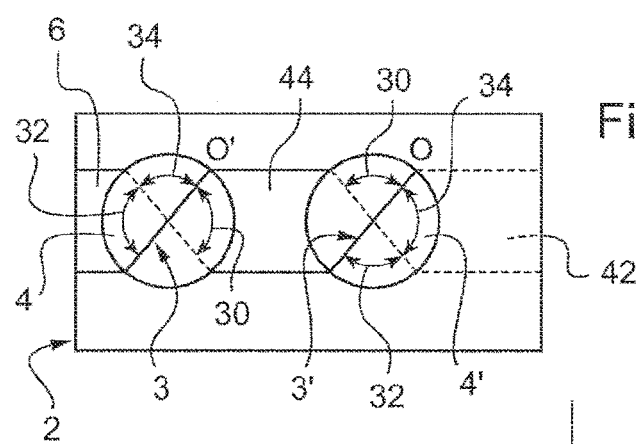
FIG. 2 is a diagrammatic cross-section view along line II-II of FIG. 1.

The shutoff means 3, 3' can each occupy different angular positions by rotation of said means 3, 3' in relation to said body 2. In FIGS. 1 and 2, a first angular position of the first shutoff means 3 is shown in solid lines and the other in dotted lines.

Said valve also comprises a kinematic chain 20. As shown by the arrow marked 21, said kinematic chain allows said shutoff means 3, 3' to be driven by the same actuating motor (not shown). Said kinematic chain comprises any means known to the person skilled in the art, such as in particular toothed wheels cooperating with pinions of the shutoff means 3, 3' and/or said actuating motor.

As shown in FIG. 2, said valve is configured to allow:
over a first angular range 30 of said first shutoff means 3, a metering of said fluid in a first outlet port 40 (FIG. 1) of said valve, said second shutoff means 3' being in a position in which said first port 40 is fully open, and
over a second angular range 32 of said first shutoff means 3, a metering of said fluid in a second outlet port 42 of said valve, said second shutoff means 3' being in a second position in which said second port 42 is fully open.

Thus a valve is provided which allows independent metering of the fluid in two separate directions, using a single kinematic chain and a single actuating motor.

Said valve can also be configured to allow, over a third angular range 34 and/or a fourth angular range of said first shutoff means 3, closure of an inlet passage 6 of said valve. Here the third 34 and fourth angular ranges alternate with the first 30 and second 32 angular ranges.

As will be shown in FIG. 2, thanks to said kinematic chain, said angular ranges 30, 32, 34 of said first shutoff means 3 correspond to angular ranges of said second shutoff means 3'. In other words, an angular position of said first shutoff means 3 corresponds to an angular position of said second shutoff means 3', and vice versa. Thus a degree of opening of the inlet port 6 corresponds to a single degree of opening of the first outlet port 40 and to a single degree of opening of said second outlet port 42.

Said kinematic chain can be configured to drive the second shutoff means 3' in the opposite direction from said first shutoff means 3, for example by using a reversing wheel. Said first, second, third and fourth angular ranges for example represent a rotation of 90°.

Figure 3:
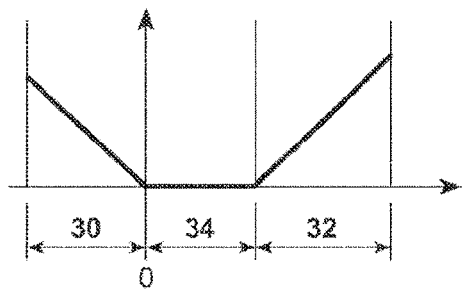
FIGS. 3 to 5 show the degree of opening of, respectively, an intake port, a first outlet port and a second outlet port of the valve in FIG. 1, as a function of the angular position of its shutoff means.

The degree of opening of the inlet passage 6 as a function of the angular position 30 of said first shutoff means 3 is shown in FIG. 3. The first angular range is travelled by said shutoff means 3 by rotation of said first shutoff means 3 in a first direction from an original angular position O. In this range, the inlet passage 6 moves in a linear progression from a closed position, for said original angular position, to a fully open position at the end of the range. The third angular range 34 is travelled by a rotation of said first shutoff means 3 in the opposite direction from said original angular position O. In this range, the inlet passage 6 remains closed. The second angular range 32 is travelled by an additional rotation of said first shutoff means 3, the inlet passage 6 then moving in linear progression from a closed position to a fully open position at the end of the range.

Figure 4:
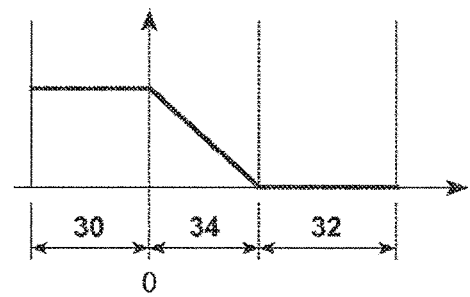

The degree of opening of the first outlet passage 40 as a function of the angular position of said second shutoff means 3' is shown in FIG. 4. When said first shutoff means 3 is in its first angular range 30, said second shutoff means 3' leaves said first outlet passage 40 open. Conversely, when said first shutoff means 3 is in its second angular range 32, said second shutoff means 3' keeps said first outlet passage 40 closed. In said third, intermediate, angular range 34 of said first shutoff means 3, the second shutoff means 3' moves in linear progression from an open position of said first outlet passage 40, for said original angular position, to a closed position of said first outlet passage 40 at the end of the range.

Figure 5:
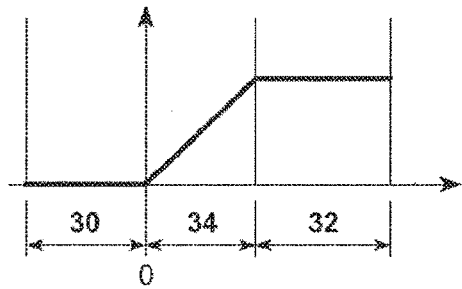
Figure 6:
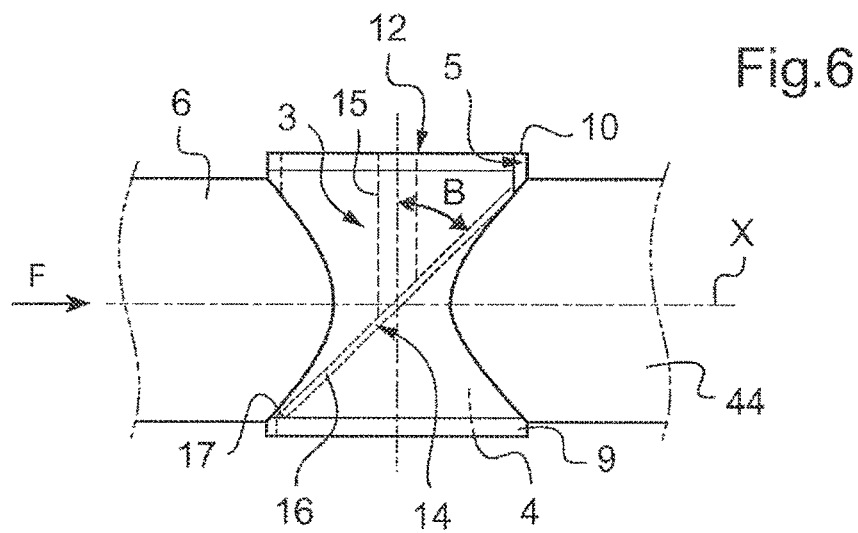
FIG. 6 is a front view of a first housing and the first shutoff means of the valve in FIG. 1.
Figure 7:
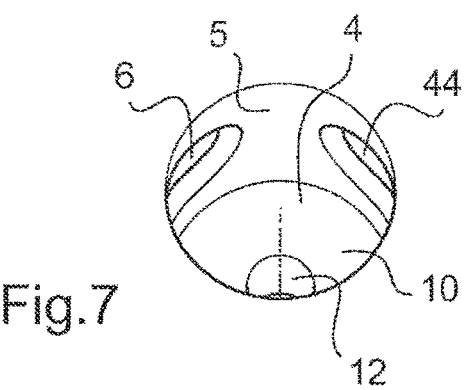
FIG. 7 shows in perspective the interior of the housing of FIG. 6.
Figure 8:
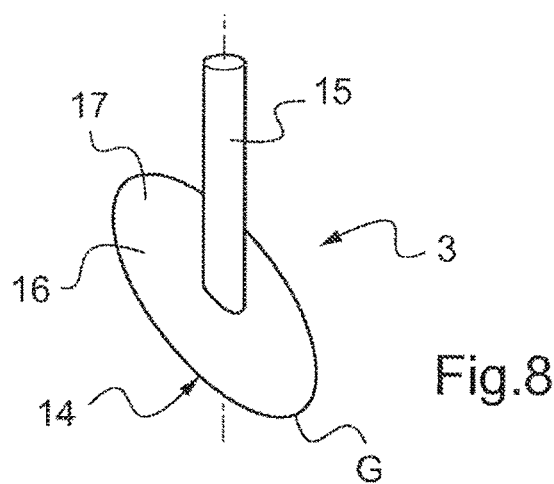
FIG. 8 shows in perspective the shutoff means of FIG. 6.

The degree of opening of the second outlet passage 42 as a function of the angular position of said second shutoff means 3' is illustrated in FIG. 5. When said first shutoff means 3 is in its first angular range 30, the said second shutoff means 3' keeps said second outlet passage 42 closed. Conversely, when said first shutoff means 3 is in its second angular range 32, said second shutoff means 3' leaves said second outlet passage 42 open. In said third, intermediate, angular range 34 of said first shutoff means 3, the second shutoff means 3' moves in a linear progression from a closed position of said second outlet passage 42, for said original angular position, to an open position of said second outlet passage 40.

It is noted that the first outlet port 40 is closed when the second outlet port is open. Reciprocally, the second outlet port 40 is closed when the first outlet port is open.

Also said first, second and third angular ranges are contiguous.

With reference again to FIGS. 1 and 2, we also see that said body 2 here comprises a first housing 4 for the first shutoff means 3 and a second housing 4' for the second shutoff means 3'. Said first and second housing 4, 4' are cylindrical with circular cross-section.

Said inlet passage 6 opens into said first housing 4. Said first 40 and second 42 outlet passages each open into said second housing 4', here axially.

Said body 2 also comprises an intermediate passage 44 for the fluid connecting said first 4 and second 4' housings.

According to a first embodiment (not shown), said first shutoff means 3 and/or said second shutoff means 3' may comprise a cylindrical plug equipped with fluid passages which may or may not correspond to said inlet passage 6, intermediate passage 44 and/or outlet passage 40, 42.

In relation to FIGS. 6 to 14, a second embodiment of said shutoff means is described, in this case of said first shutoff means 3, in relation to the corresponding housing 4.

Said housing is delimited by a side wall 5. The inner housing may be similar to a bore. The inlet passage 6 and intermediate passage 44 open in the wall of this, here radially to axis A of said housing 4. These inlet 6 and intermediate passages 44 are for example aligned in relation to each other. Here they present a longitudinal axis X perpendicularly intersecting axis A of housing 4, and have identical diameters.

We also see that the inner cylindrical housing 4 is totally closed by a transverse base 9 at one of its ends, while its opposite end has a transverse lid 10 extending into an axial bore 12. Through this passes the shutoff means 3 which cooperates with said kinematic chain (not shown) and is managed by a control unit known in itself, in order to drive the shutoff means 3 in rotation around axis A.

Said shutoff means 3 here has an inclined shutoff part 14 and a connecting rod 15. In particular the inclined part 14 is shaped as a rotary, elliptical flap 16 arranged in a plane which is inclined in relation to the axis A of the housing 4 and centered on said axis A, such that its peripheral edge 17 is in constant contact with the side wall 5 of the housing 4, so as to isolate the inlet passage 6 and intermediate passage 44 in at least one given angular position of said shutoff means, in order to interrupt the circulation of fluid or to create a fluidic communication between the inlet passage 6 and the intermediate passage 44, with a flow which is adjustable according to the given angular opening of the shutoff flap. This peripheral edge 17 thus constitutes a generatrix G which is always in sealed contact with the side wall 5 of the housing.

The term "inclined" means strictly between 0° and 90°. A "flap" is a part with two surfaces which are inclined in relation to axis A and linked by the peripheral edge 17. Said inclined surfaces may be parallel to each other. The part has a small thickness, namely a distance between said inclined surfaces which is very much smaller than the diameter of the housing 4, in particular ten times smaller. It is for example a rotary elliptical disk.

Geometric considerations apply in order to ensure the proper function of the valve 1. The flap 16 has an elliptical form with long axis greater than the diameter of the circular housing 4, and small axis substantially smaller than the diameter of the circular housing 4. Here the diameter of the circular housing 4 is also greater than identical diameters of the fluid inlet passage 6 and intermediate passage 44. The connecting rod 15 is arranged along axis A of the housing, so as to be centered on the inclined disk with angle B, between the inclined plane of the disk and axis A, here equal to 45°. To have a constant contact with the side wall 5 of the housing, the long axis of the disk 16 is therefore substantially equal to the diameter of the housing multiplied by $\sqrt{2}$. This contact may be defined as being a cylinder/cylinder contact between the wall 5, with circular cross-section, of the housing 4 and the generatrix G, which corresponds to the peripheral edge 17 of the inclined disk 16 and is circular in projection onto a plane perpendicular to the axis of rotation of the flap. The small axis of the flap 16 may be substantially greater than the diameter of the fluid inlet passage 6 and intermediate passage 44.

It is found that installation of the shutoff means 3 in the housing 4 of the valve body requires no fastidious adjustment operation, merely positioning of the means 3 in axial stop in the housing in order to center the disk 16 in relation to the fluid passages.

The rod 15 is connected at one end to the disk 16, by assembly or molding, or formed with the disk so as to give a monoblock shutoff means 3. For example, the disk 16 may be made of plastic and the rod 15 of metal or vice versa, or both may be made of plastic or metal, depending on the monoblock or composite construction selected. The other end of the rod passes through the axial hole 12 in the body 2 via a guiding bearing 18 (FIGS. 9 to 12) which is integral with said body 2, in order to be connected to said kinematic chain.

In the position shown in FIG. 12, the inclined disk 16 of the shutoff means 3 isolates the inlet passage 6 from the intermediate passage 44, preventing circulation of the fluid through the valve 1. For this, we see that the peripheral edge 17 of the inclined disk 16 cooperates tightly and fully with the side wall 5 of the cylindrical housing 4, in the manner of a partition separating the housing into two separate and sealed inner chambers, each facing one of the fluid inlet passage 6 and intermediate passage 44. This angular position of the inclined disk 16 and hence of the shutoff means 3 corresponds to a closure of the valve 1, with the starting point being a zero angular rotation of 0° of the shutoff means 3.

When the kinematic chain stresses the rod 15, it causes the rotation of the shutoff means 3 through a desired angle corresponding to a specific flow of the fluid through the valve 1. In FIG. 9, we see that the shutoff means 3 via its rod 15 has undergone a rotation of +90° clockwise around axis A, so that the inclined disk 16 has turned in the housing 4 in order to lie in a plane which is substantially parallel to the inlet passage 6 and intermediate passage 44 of the body 2 of the valve. On further rotation, the peripheral edge 17 is no longer totally in contact with the side wall 5 of the housing, but only partially, since opposing parts of the edge 17 lie opposite the inlet passage 6 and intermediate passage 44. This reset angular position of the disk allows the passage of fluid between the inlet passage 6 and intermediate passage 44 via the sealed inner housing 4 of the body, and corresponds to full opening of the valve 1, for which the fluid circulation flow is at a maximum and directed towards the second housing 4' where it will be directed into one of the outlet passages.

The inclined disk 16 may also occupy a symmetrical position to that above, i.e. the shutoff means has turned under the action of the drive device through −90° anticlockwise in relation to the 0° closed position. Thus the inclined disk 16 lies parallel to the inlet passage 6 and intermediate passage 44, ensuring a maximum flow towards the second housing 4' where it will be directed into the other of the outlet passages.

An intermediate position of the shutoff means 3 is illustrated as an example in FIG. 10 and corresponds to a rotation of the inclined disk 16 by +45° around axis A. The edge 17 of the disk is then partly opposite the inlet passage 6 and intermediate passage 44, bringing these into communication for the passage of fluid under a medium flow.

FIG. 11 in turn shows that the edge 17 of the inclined disk 16 is fully in contact with the side wall of the housing when the shutoff means is at approximately 5° from the initial closed position of 0°. This means that the total overlap of the disk 16 and housing 4 allows tolerance of an angular defect on assembly without reducing the level of seal in the valve. Closure of the valve is finally obtained over an angular range of around 10° (±5°).

The diagrams in FIGS. 13 and 14 clearly show the position of the inclined disk 16 according to the height (millimeters) of the side wall 5 of the housing, which 360° wall is developed from −180° to +180° to be shown flat.

On FIG. 13, the inclined disk 16 of the shutoff means 3 occupies the closed position of the valve 1 (FIG. 12), i.e. with zero rotation of said means. In relation to the inlet 6 and outlet 7 of identical diameters, smaller than that of the housing 4, and illustrated by contour C of the conduits 8 delimiting them, we note that the peripheral edge 17 forming the generatrix G of the disk, shown in plan according to a sinusoidal shape, is constantly in contact with the side wall 5 of said housing 4. In this way, the closure of the valve is total, inlet passage 6 and intermediate passage 44 being perfectly isolated from each other, which prevents any circulation of fluid through the valve 1.

With regard to FIG. 14, the inclined disk 16 occupies the fully open position of the valve, i.e. with a rotation of ±90° of the shutoff means 3. In this case we note that in sinusoidal form (offset by π/2 in relation to FIG. 11), the peripheral edge 17 then passes in a large part (reference P1) over the inlet passage 6 and intermediate passage 44 into the middle thereof. Only the other part (reference P2) of edge 17 remains in contact with the side wall 5 of the housing, which shows clearly the full opening of the valve 1 for a maximum fluid flow through this.

Such a valve consequently ensures a seal in both directions of closure, by adaptation of the inclined disk in the circular housing (cylinder-cylinder contact). Said disk can also be driven over more than 360°. Because of its symmetry, it can be mounted in both directions without requiring a polarization aid in the body of the valve. Also, as the edge of the disk moves linearly on the cylindrical wall, this avoids any fouling between the disk and the wall and ensures self-cleaning of the valve, which is beneficial in the case of an EGR valve.

With reference again to FIG. 1, we note that said second shutoff means 3' is produced for example identically to that already mentioned. Said second housing 4' however differs in that the fluid no longer leaves this radially but, as already stated, axially through the first 40 and second 42 outlet passage. Said intermediate passage 44 here opens radially into said second housing 4'.

In other words, in said first angular range, the disk 14 of said second shutoff means 3' diverts the flow which passes from a radial orientation on leaving said intermediate passage 44 in said second housing 4', to an axial orientation in order to enter said first outlet passage 40 from said second housing 4'.

In said second angular range, said disk 14 of said second shutoff means 3' occupies a symmetrical position to that above, and diverts the flow which passes from a radial orientation on leaving said intermediate passage 44 in said second housing 4', to an axial orientation in order to enter said second outlet passage 42, provided opposite the first, from said second housing 4'.

Said second shutoff means 3' therefore essentially functions here as a deflector.

The housings 4, 4' may be parallel with each other, as may the control rods 15 of the corresponding first 3 and second 3' shutoff means.

The invention claimed is:

1. A fluid circulation valve comprising:
   a body through which said fluid can pass;
   a first and a second shutoff means arranged in series, in the direction of flow of the fluid, in said body, wherein each of the first and second shutoff means is able to occupy different angular positions by rotation of said means in relation to said body; and
   a kinematic chain allowing driving of said shutoff means by the same actuating motor, said valve being configured to allow:
   over a first angular range of said first shutoff means, a metering of said fluid in a first outlet port of said valve, said second shutoff means being in a position in which said first port is fully open,
   over a second angular range of said first shutoff means, a metering of said fluid in a second outlet port of said valve, said second shutoff means being in a second position in which said second port is fully open.

2. The valve as claimed in claim 1, wherein said valve is also configured to allow, over a third and/or fourth angular range of first shutoff means, closure of an inlet passage of said valve.

3. The valve as claimed in claim 2, wherein the third and fourth ranges alternate with the first and second ranges.

4. The valve as claimed in claim 2, wherein said body comprises a first housing for the first shutoff means and a second housing for the second shutoff means, said first and second outlet passages opening into said second housing.

5. The valve as claimed in claim 4, wherein said inlet passage opens into said first housing.

6. The valve as claimed in claim 4, wherein said body comprises a passage for the fluid connecting said first and second housings.

7. The valve as claimed in claim 4, wherein the first and/or the second shutoff means each comprise at least one first shutoff part (14) arranged in a plane which is inclined in relation to said first and/or second housing respectively and cooperates with a side wall of the corresponding housing via a peripheral generatrix, so as to ensure a sealed contact between the first and/or second shutoff means firstly and the body secondly in at least one angular position.

8. The valve as claimed in claim 7, wherein said inclined part of the first and/or second shutoff means is shaped as a rotary disk, the peripheral edge of which constitutes the generatrix for contact with the side wall of the corresponding housing to ensure a cylinder-on-cylinder contact.

9. The valve as claimed in claim 7, wherein the inclined shutoff part forms an angle of substantially 45° with axis of the corresponding housing of the body.

10. The valve as claimed in claim 7, wherein said first and/or said second shutoff means comprises a control rod which is linked to the inclined part in order to drive this in rotation and which is arranged in the axis of said corresponding housing, passing via the center of said inclined part.

11. The valve as claimed in claim 10, wherein said rod and said inclined part are produced as one piece.

12. The valve as claimed in any of claim 10, wherein on the side opposite the inclined shutoff part, the rod is mounted in a guide bearing integral with the body, and/or is connected at the outlet thereof to a means for driving said kinematic chain in rotation.

13. The valve as claimed in claim 10, wherein the rods of the first and second shutoff means are parallel with each other.

14. The valve as claimed in claim 1, wherein said kinematic chain, said body and said first and/or said second shutoff means are configured to allow a rotation of said first and/or second shutoff means over more than 360°.

15. The valve as claimed in claim 1, wherein said kinematic chain, said body and said first and/or second shutoff means are configured to allow a rotation of said first and/or second shutoff means in both directions.

* * * * *